United States Patent [19]
Chapman, Jr. et al.

[11] Patent Number: 5,465,294
[45] Date of Patent: Nov. 7, 1995

[54] SYSTEM AND METHOD FOR RECOVERING FROM A TELECOMMUNICATIONS DISASTER

[75] Inventors: John M. Chapman, Jr., Aurora, Ill.;
David N. Decker, Phillipsburg, N.J.;
Sondra L. Diles, Kansas City, Mo.;
Nicholas P. DeVito, Bedminster, N.J.;
William C. Leach, Glen Gardner, N.J.;
Richard Lechner, Fords, N.J.; Allen D. Langham, Overland Park, Kans.;
Willard R. Manning, Edison, N.J.;
Thomas R. Ryan, Grayson, Ga.;
Edward J. Smith, La Plata, Md.;
William C. Thompson, Jr., Grayson;
Robert Yursis, Roswell, both of Ga.

[73] Assignee: AT&T Corp., Murray Hill, N.J.

[21] Appl. No.: 268,391

[22] Filed: Jun. 30, 1994

[51] Int. Cl.⁶ ................................................. H04M 7/00
[52] U.S. Cl. .................... 379/207; 379/201; 379/221; 379/220; 379/279
[58] Field of Search .................... 379/221, 201, 379/207, 45, 58, 59, 279, 327, 220; 370/16

[56] References Cited

U.S. PATENT DOCUMENTS

| | | | |
|---|---|---|---|
| 4,197,434 | 4/1980 | Inamasu et al. | 379/327 |
| 4,839,892 | 6/1989 | Sasaki | 379/45 |
| 5,138,657 | 8/1992 | Colton et al. | 379/220 |
| 5,146,452 | 9/1992 | Pekarske | 370/16 |
| 5,175,866 | 12/1992 | Childress et al. | 379/279 |
| 5,182,744 | 1/1993 | Askew et al. | 370/16 |
| 5,185,697 | 2/1993 | Jacobs et al. | 397/45 |
| 5,210,786 | 5/1993 | Itoh | 379/59 |
| 5,222,128 | 6/1993 | Daly et al. | 379/210 |

OTHER PUBLICATIONS

Bodson et al., "When The Lines Go Down", IEEE Spectrum, Mar. 1992, pp. 40–44.

*Primary Examiner*—James L. Dwyer
*Assistant Examiner*—Scott Wolinsky

[57] ABSTRACT

A telephone disaster recovery process for quickly re-establishing long distance telephone service to a telephone LEC office after a telephone central office connected to the LEC office has been rendered inoperable by a disaster is described. The central office is located at a disaster site. The process operates by assessing the disaster and identifying elements of an on-site component needed to address the disaster. The elements of the on-site component are transported to the disaster site, and are mapped to corresponding elements of the inoperable central office. These elements of the on-site component are configured and interconnected according to the mapping to enable the on-site component to functionally emulate the inoperable central office. Then, the on-site component is connected to the LEC office, and is also connected to an off-site component using communication media in a long distance telephone network. The off-site component emulates switching functions of the inoperable central office, and has been previously connected to other telephone central offices via other communication media in the long distance telephone network. Finally, the on-site component and the off-site component are brought on line to thereby re-establish long distance telephone service to the LEC office.

9 Claims, 7 Drawing Sheets

5,465,294

SYSTEM AND METHOD FOR RECOVERING FROM A TELECOMMUNICATIONS DISASTER

BACKGROUND OF THE INVENTION

1. Field of the Invention

The present invention relates to a system and method for quickly re-establishing long distance telephone service after a long distance carrier's end office has been rendered inoperable by a disaster.

2. Related Art

The telephone system that exists today in the United States includes local exchange companies and long distance carriers which provide local telephone service and long distance telephone service, respectively, to users. The local exchange companies (LEC) each include a plurality of LEC offices. Users' telephones and other telephonic devices (such as facsimile machines) are connected to these LEC offices.

The long distance carriers each include a plurality of central offices connected to one another by a long distance telephone network. A local exchange company's LEC offices are connected to a long distance carrier's central offices.

A long distance telephone call represents a connection from a user's telephone to the LEC office in the local exchange company, to the long distance carrier's central office, and then to the long distance telephone network. The call is routed through the long distance telephone network to the destination location, where the connection continues through the central office and the LEC office situated at the destination location, and finally to the destination telephone.

As is apparent from the above discussion, a local exchange company's LEC office (and all users connected to that LEC office) obtain access to the long distance telephone network via the long distance carrier's central office. Thus, from the perspective of that LEC office (and, again, all users connected to the LEC office), the long distance carrier's central office represents a gateway to long distance communication with the outside world. This gateway closes if the central office becomes inoperable. If the gateway closes, then users connected to the LEC office (that is connected to the inoperable central office) become shut off from long distance communication with the outside world.

Various factors will cause a central office to become inoperable. Some of these factors are minor and can be remedied in a timely manner. For example, a few components in the central office may break down, thereby rendering the central office either partially or completely inoperable. In this case, the central office can be quickly and easily restored to service by repairing or replacing the components.

Other factors are major and result in the central office being inoperable for an extended period of time. For example, the central office may be severely damaged (perhaps completely destroyed) by a natural disaster such as an earthquake, a flood, a fire, a tornado, etc. Also, the central office may be severely damaged by a system failure that damages most of the components in the central office, such as a system-wide electrical failure.

Recovery from a major failure is conventionally handled in the same way as recovery from a minor failure. The damaged central office is repaired (or, in some cases, completely re-built). Such repairs may take months. During this time, users connected to the LEC office (that is connected to the inoperable central office) are shut off from long distance communication with the outside world. Thus, this conventional approach for restoring service after a major failure is flawed since it denies to users long distance telephone capability for an extended period of time.

In reality, users adversely affected by the inoperable central office are not entirely shut off from long distance communication since they can utilize the long distance services provided by other long distance carriers while the LEC office is being prepared. However, these users may not return to the original long distance carrier (that is, the long distance carrier that owns the inoperable central office) once the central office is restored to service. Thus, the above-described conventional approach for restoring service after a major failure is further flawed since it causes the original long distance carrier to lose customers.

Thus, what is required is a system and method for quickly re-establishing long distance telephone service after a long distance carrier's central office has been rendered inoperable by a disaster.

SUMMARY OF THE INVENTION

The present invention is directed to a telephone disaster recovery unit and process for quickly re-establishing long distance telephone service to a telephone LEC office after a telephone central office connected to the LEC office has been rendered inoperable by a disaster. The LEC office and the central office are located at a disaster site.

The telephone disaster recovery unit includes a mobile, on-site component configured to emulate access and intertoll functions of the inoperable central office and an off-site component to emulate switching functions of the inoperable central office. The off-site component is permanently positioned in a predetermined location and has been previously connected to other telephone central offices via communication media in a long distance telephone network.

The telephone disaster recovery process operates by first assessing the disaster and identifying elements of the on-site component needed to address the disaster. Such identified elements of the on-site component are transported to the disaster site, and are mapped to corresponding elements of the inoperable central office. Then, the elements of the on-site component are configured and interconnected according to the mapping to enable the on-site component to functionally emulate the inoperable central office. The on-site component is connected to the LEC office, and is also connected to the off-site component using communication media in the long distance telephone network. Finally, the on-site component and the off-site component are brought on line to thereby re-establish long distance telephone service to the LEC office.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

1. Overview of the Invention

The present invention is directed to a system and method for quickly re-establishing long distance telephone service to users adversely affected by the inoperability of a long distance carrier's central office, wherein this central office has been rendered inoperable by a major failure. Major failures include natural disasters (such as an earthquake, a flood, a fire, a tornado, etc.) and severe system failures at the central office (such as a system-wide electrical failure).

Figure 1:
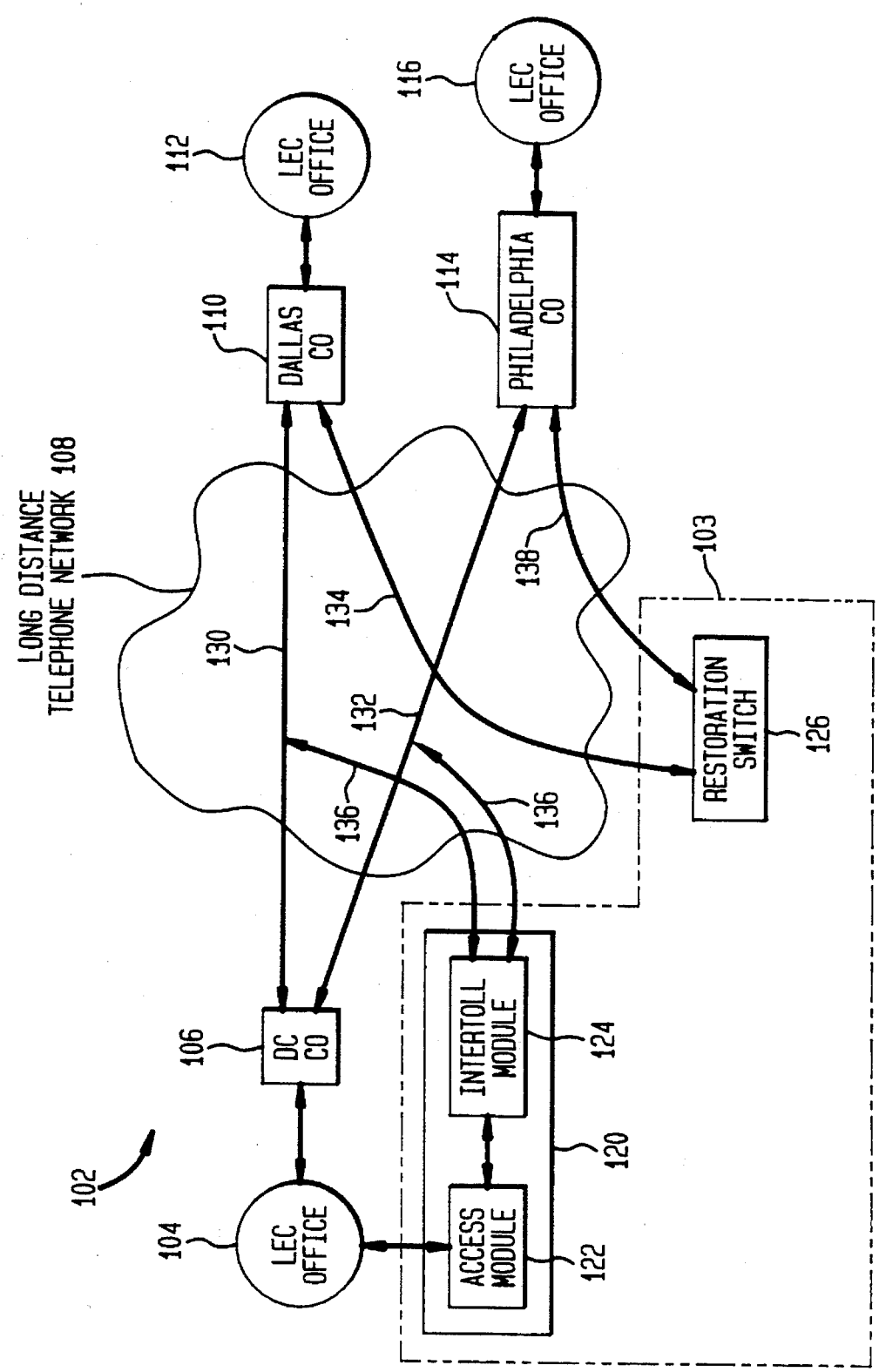
FIG. 1 is a block diagram of a telephone system showing the use of an on-site component and an off-site component to replace an inoperable central office.

Consider a telephone system 102 shown in FIG. 1. This telephone system 102 includes a plurality of LEC offices 104, 112, 116 which are part of one or more local exchange companies (LEC). In the scenario of FIG. 1, LEC office 104 is located in Washington, DC, LEC office 112 is located in Dallas, and LEC office 116 is located in Philadelphia.

LEC office 104 is connected to a DC central office (CO) 106. Similarly, LEC offices 112 and 116 are connected to a Dallas central office 110 and a Philadelphia central office 114. The DC central office 106, Dallas central office 110, and Philadelphia central office 114 are part of a long distance carrier.

These central offices 106, 110, 114 are connected to each other via a long distance telephone network 108, which is also part of the long distance carrier. Specifically, the central offices 106, 110, 114 are connected to each other via a plurality of communication media 130, 132, 134, 138 which makes up the long distance telephone network 108. These communication media 130, 132, 134, 138 each represents any type of communication medium, such as fiber optic cable, radio, satellite, etc.

A long distance telephone connection between, for example, the DC LEC office 104 and the Dallas LEC office 112 extends from the originating telephone (not shown) to the DC LEC office 104, to the DC central office 106, through the long distance telephone network 108 via communication medium 130, to the Dallas central office 110, to the Dallas LEC office 112, and finally to the destination telephone (not shown). Similarly, a long distance telephone connection between the DC LEC office 104 and the Philadelphia LEC office 116 extends from the originating telephone (not shown) to the DC LEC office 104, to the DC central office 106, through the long distance telephone network 108 via communication medium 132, to the Philadelphia central office 114, to the Philadelphia LEC office 116, and finally to the destination telephone (not shown).

As is apparent from FIG. 1 and the above discussion, the DC LEC office 104 (and all users connected to the DC LEC office 104) obtains access to the long distance telephone network 108 via the DC central office 106. Thus, from the perspective of the DC LEC office 104 (and, again, all users connected to the DC LEC office 104), the DC central office 106 represents a gateway to the long distance telephone network 108 and communication with the outside world. This gateway closes if the DC central office 106 becomes inoperable. If the gateway closes, then users connected to the DC LEC office 104 become shut off from long distance communication with the outside world.

The present invention is directed to quickly re-establishing long distance telephone service to users adversely affected by the inoperability of an LEC office, such as the DC LEC office 104, wherein the LEC office is rendered inoperable by a major failure. Such users include those connected to the DC LEC office 104 who cannot contact users over the long distance telephone network 108 due to the inoperability of the DC central office 106, and those connected to other LEC offices (such as the Dallas LEC office 112 and the Philadelphia LEC office 116) who cannot contact users at the DC LEC office 104 due to the inoperability of the DC central office 106.

The present invention operates to replace the inoperable central office 106 with a telephone disaster recovery unit 103. Once integrated into the telephone system 102, the telephone disaster recovery unit 103 effectively shunts the inoperable central office 106 from the telephone system 102.

The telephone disaster recovery unit 103 emulates (duplicates) the functionality of the inoperable central office 106. Functions that are normally performed by the inoperable central office 106 (before the central office 106 was rendered inoperable) are performed by the telephone disaster recovery unit 103. Users connected to the affected LEC office 104 (that is, the LEC office 104 connected to the inoperable central office 106) are re-connected to the long distance telephone network 108 via the telephone disaster recovery unit 103. Consequently, long distance telephone service is restored to users connected to the affected LEC office 104.

The telephone disaster recovery unit 103 includes an on-site component 120 and an off-site component 126. Both the on-site component 120 and the off-site component 126 are fully self-contained in terms of power and environmental systems. The on-site component 120 emulates access and intertoll functions of the inoperable central office 106. The off-site component 126 emulates major switching functions of the inoperable central office 106. The on-site component 120 is deployed to a disaster site (that is, the site where an inoperable central office is located) when necessary. The off-site component 126 is permanently connected to all of the central offices 110, 114 of the long distance carrier via the long distance telephone network 108 (see communication media 134 and 138, for example, in FIG. 1). The on-site component 120 and the off-site component 126 collectively emulate all functions of the inoperable central office 106 that are necessary to restore long distance telephone service to users adversely affected by the inoperable central office 106.

Preferably, the on-site component 120 is maintained in a plurality of trailers which are stored in a storage location until deployment. The approximate size of each of these trailers is 43 feet by 53 feet (which is the approximate size of standard size trailer flatbeds). The equipment is preferably packaged in 8 feet by 8 feet by 20 feet shipping containers, and these containers are placed on the trailers. The off-site component 126, which is too large to practically transport, is permanently maintained at a strategically located site (preferably Illinois).

The manner in which long distance telephone service is restored after a central office 106 is rendered inoperable according to the present invention is generally as follows. The trailers comprising the on-site component 120 are transported by whatever means necessary (truck, rail, plane, ship, etc.) to the site of the inoperable central office 106 (called the disaster site). The on-site component 120 is connected to the LEC office 104. Then, the on-site component 120 is connected to the off-site component 126 by connecting the on-site component 120 to the long distance telephone network 108 using spare communication media 136 (note that, in the example scenario presented in FIG. 1, communication with the off-site component 126 is achieved via existing, operating central offices 110, 114). Such spare communication media 136 is part of the long distance telephone network 108. Integration of the telephone disaster recovery unit 103 into the telephone system 102 is then complete.

Users connected to the affected LEC office 104 are re-connected to the long-distance telephone network 108 via the telephone disaster recovery unit 103. For example, a long distance telephone connection between the DC LEC office 104 and the Dallas LEC office 112 extends from the originating telephone (not shown) to the DC LEC office 104, to the on-site component 120, to the off-site component 126 via the long distance telephone network 108, through the long distance telephone network 108 (as routed therethrough by the off-site component 126), to the Dallas central office 110, to the Dallas LEC office 112, and finally to the destination telephone (not shown).

By using the telephone disaster recovery unit 103 of the present invention, it is possible to quickly restore long distance telephone service to users adversely affected by the inoperability of the LEC office 106. Such long distance service can be maintained by the telephone disaster recovery unit 103 until the inoperable central office 106 is permanently repaired and/or re-built. Thus, according to the present invention, long distance telephone service to users is not interrupted while the inoperable central office 106 is being permanently repaired and/or re-built.

The on-site component 120 and the off-site component 126 are discussed in greater detail in the sections below.

II. On-Site Component

The on-site component 120 includes an access module 122 and an intertoll module 124. The access module 122 is housed in preferably a single trailer (although it can alternatively be housed in a plurality of trailers). The intertoll module 124 is housed in a plurality of trailers. By housing them in trailers, it is possible to quickly and relatively easily transport the access module 122 and the intertoll module 124 to the site where the inoperable central office is located. In this manner, it is possible to quickly restore long distance telephone service after a central office has failed.

The access module 122 duplicates (or emulates) the access functions of the inoperable central office 106. The access module 122 represents an interface point between the local exchange company and the long distance carrier. More particularly, the access module 122 represents a "handoff" point where telecommunications traffic is exchanged between the local exchange company and the long distance carrier. This handoff point is either a point of presence (POP) or a point of interface (POI), which are terms that are well known to persons skilled in the relevant art.

The intertoll module 124 duplicates (or emulates) the intertoll functions of the inoperable central office 106. Essentially, the intertoll module 124 routes telecommunication traffic between "pipes" of the local exchange company and communication media (such as fiber optic cables) of the long distance telephone network 108.

The access module 122 and the intertoll module 124 shall now be described in greater detail with reference to FIGS. 2A and 2B which is a more detailed block diagram of the telephone disaster recovery unit 103 of the present invention.

The LEC office 104 is required to transfer to the access module 122 telecommunications traffic that is in a predetermined format. This format is preferably DS3 (digital signal level three), which is well known. DS3 represents, for example, 672 individual voice circuits.

This DS3 traffic is transferred between the LEC office 104 and the access module 122 over a number of physical lines (such as wires or cables). Seven physical lines 201A–201G are shown in FIGS. 2A and 2B although the actual number of physical lines between the LEC office 104 and the access module 122 is implementation dependent.

The traffic that is exchanged over the physical lines 201A–201G varies by destination. For example, traffic over physical line 201A may be to/from Dallas, whereas traffic over physical line 201G may be to/from Philadelphia.

Elements of the intertoll module 124 are connected to fiber optic cables 136A–136T (or other type of communication medium) of the long distance telephone network 108. These fiber optic cables 136A–136T are connected to different destinations generically represented as 290. As depicted in FIG. 1, such destinations 290 may include the LEC offices 112, 116, the central offices 110, 114, and/or the restoration switch 126.

The access module 122 and the intertoll module 124 operate to route the traffic on the physical lines 201A–201G from the LEC office 104 to the proper fiber optic cables 136A–136T of the long distance telephone network 108 according to destination. For example, if traffic over physical line 201A is to/from Dallas, and cable 136A carries traffic to/from Dallas, then the access module 122 and the intertoll module 124 ensures that traffic over physical line 201A is routed to cable 136A.

The access module 122 performs this routing function in a static manner. The access module 122 includes a physical patch panel 202 which is used to connect the lines 201A–201G to physical paths contained in the intertoll module 124. Such connection is performed according to destination. Consider the above example where traffic over physical line 201A is to/from Dallas, and cable 136A carries traffic to/from Dallas. In this example, a patch 202A connects line 201A to a DACS IIIL (digital access cross connect system three large) 280, which provides connectivity to cable 136A (as described below).

Such connections using the patch panel 202 are established when the access module 122 is configured to duplicate the access functionality of the inoperable central office 106 (this is described further below). Essentially, the destinations of the traffic over the physical lines 201A–201G are identified and the appropriate connections in the patch panel 202 are made.

The access module 122 also performs other functions pertaining to converting the traffic from the LEC office 104 to a form which can be processed by the intertoll module 124. For example, the access module 122 converts traffic received from the LEC office 104 to the DS3 format when such conversion is necessary (that is, when the LEC office 104 does not provide DS3 traffic to the access module 122). The access module 122 includes a sufficient power supply and accessory equipment (such as cooling equipment) to accommodate any equipment which may be necessary to perform these conversion functions.

The intertoll module 124 shall now be described.

The equipment of the intertoll module 124 is distributed among a number of trailers wherein the equipment placed in any one trailer is functionally related. Such distribution of equipment in trailers is reflected in FIGS. 2A and 2B However, it should be understood that the distribution shown in FIGS. 2A AND 2B is provided for example purposes only, and other distributions are within the scope of the present invention.

The intertoll module 124 has sufficient capacity to replace any central office 106, 110, 114 of the long distance carrier. Central offices 106, 110, 114 vary in their traffic load and requirements. Accordingly, when the telephone disaster recovery unit 103 is used to replace a central office having a relatively light traffic load, the capacity of the intertoll module 124 may not be fully utilized. However, the intertoll module 124 is constructed and configured so that its capacity is not exceeded when it is called upon to replace the central office having the greatest traffic load and requirements. For example, the intertoll module 124 preferably includes additional trailers not shown in FIGS. 2A and 2B. These additional trailers are transported and used when the addition capacity provided by them is necessary to replace the inoperable central office.

Figure 2A:
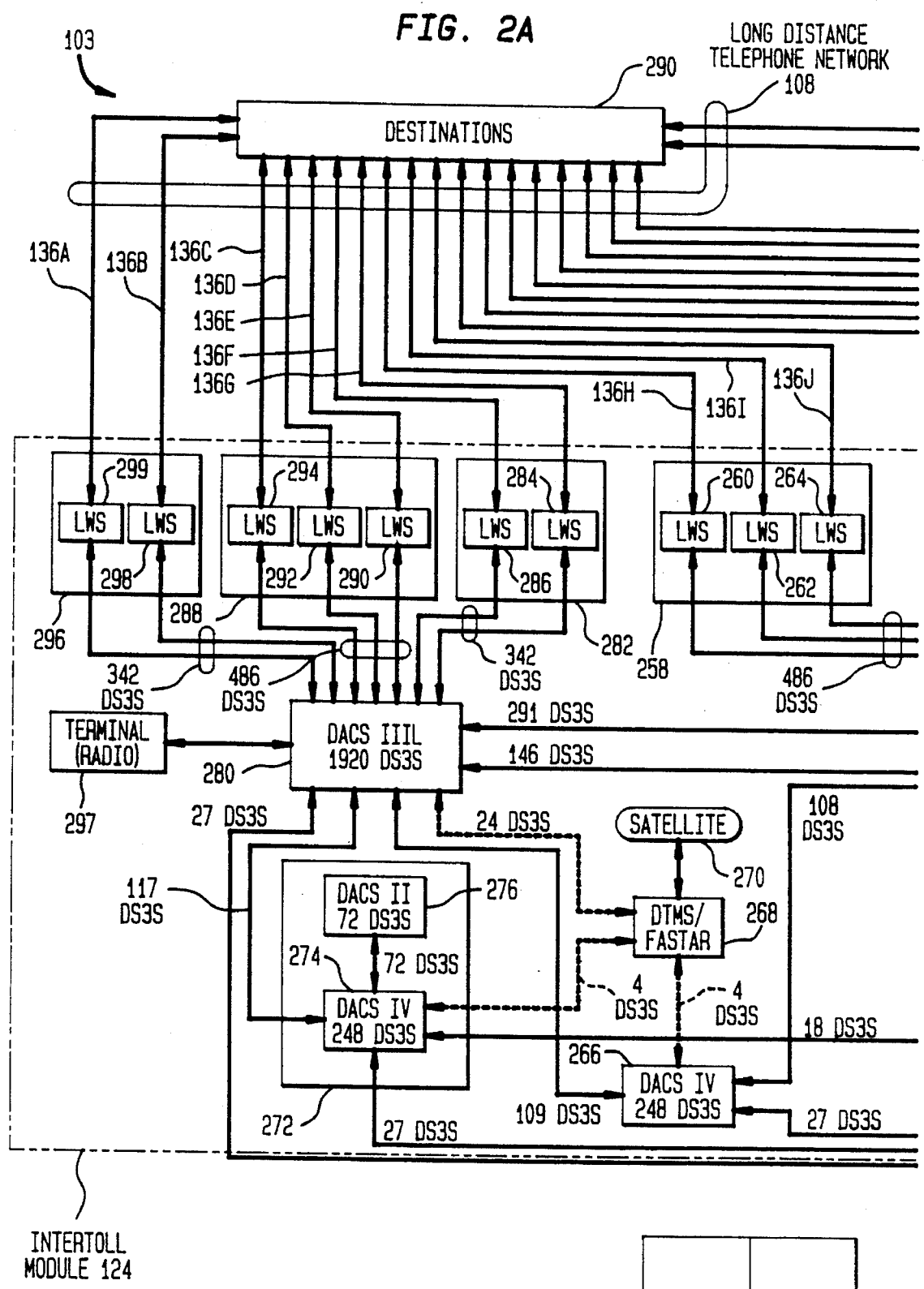
FIGS. 2A and 2B represent a detailed block diagram of an intertoll module according to the present invention.
Figure 2B:
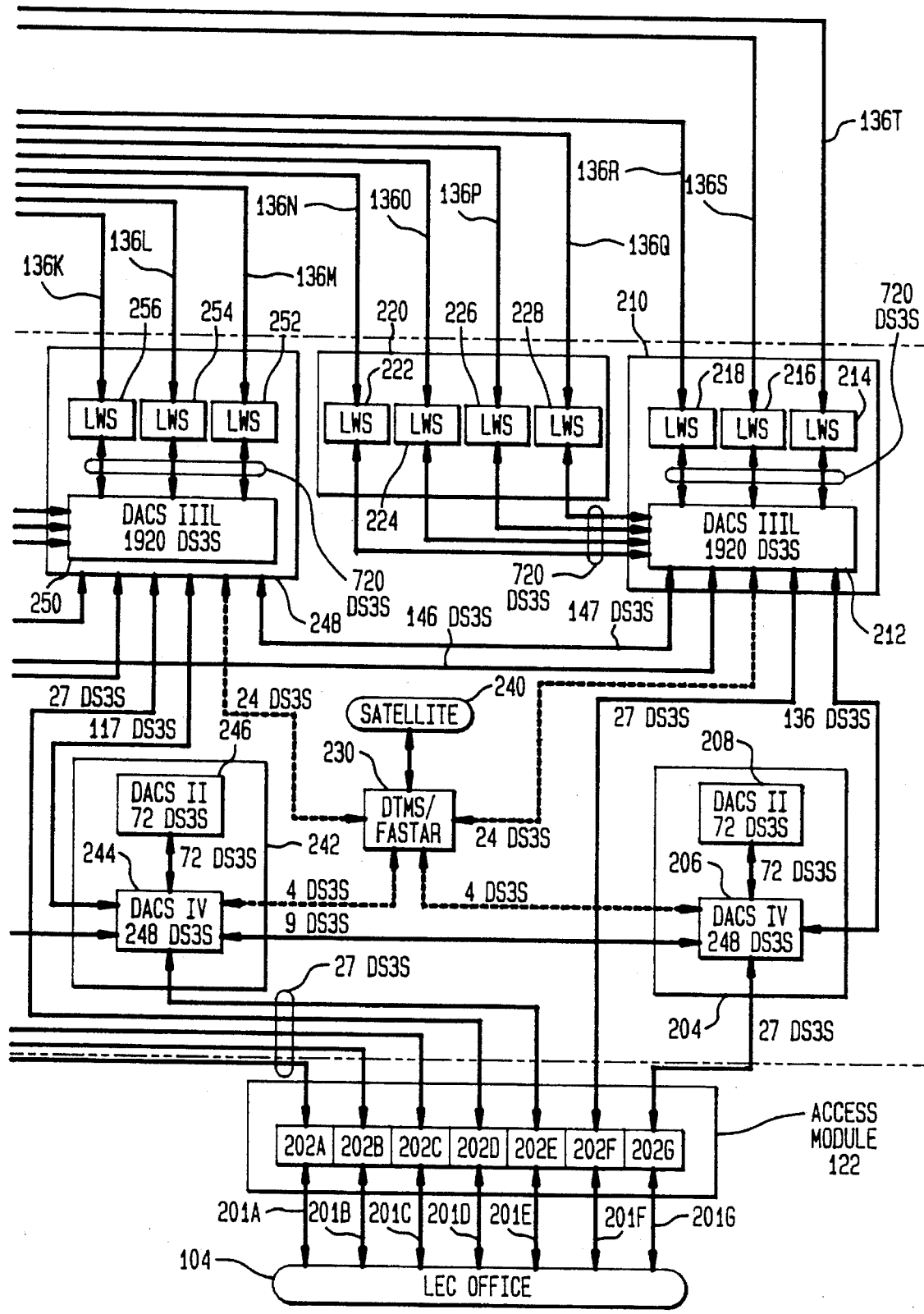

The intertoll module 124 in the embodiment shown in FIGS. 2A and 2B essentially includes three primary communication paths. The first primary path includes trailers 204, 210, and 220. The second primary path includes trailers 242, 248, and 258. The third primary path includes trailers 272, 280, 282, 288, and 296. As described below, these three paths provide similar functionality. They differ in their connectivity to fiber optic cables 136A–136T of the long distance telephone network 108.

It should be understood that the paths shown in FIGS. 2A and 2B are provided for example purposes only. Different paths employing the same, more, or less trailers and equipment, and having the same or different connectivity between equipment, may be used depending on the requirements of the inoperable central office. In other words, the intertoll module 124 is configured in terms of equipment and connectivity such that the functionality of the inoperable central office is duplicated.

As just noted, the first primary path of the intertoll module 124 includes trailers 204, 210, and 220. These trailers 204, 210, and 220 shall now be discussed.

Trailer 204 houses a DACS IV (digital access cross connect system type four) unit 206 and a DACS II (digital access cross connect system type two) unit 208. The structure and operation of DACS IV and DACS II units are well known. DACS IV and DACS II units (or equivalent units) are commercially available from a number of manufacturers, such as AT&T Network Systems, 1600 Osgood Street, North Andover, Mass. It should be understood, however, that other units can be used in place of the DACS IV and DACS II units, as long as these other units perform the functions of the DACS IV and DACS II units, as shall now be described.

Generally, a DACS IV unit is preferably a software based, high capacity, digital cross-connect system that merges cross-connect and multiplexer functions. It helps manage DS1, DS3, and other facilities more efficiently by automating network route restoration, remote service and facility provisioning, and remote surveillance and test access. Its software controlled cross-connect facility allows centralization and automation of operation, administration, maintenance, and provisioning functions.

A DACS IV unit can terminate and cross-connect DS1 and DS3 signals from transmission facilities or from DS1 and/or DS3 based network elements. All cross-connections are done at the DS1 signal level. DS3 signals are demultiplexed within a DACS IV unit into 28 DS1 signals to access the switch network.

A wide range of termination mixes is supported by the system architecture. The number of ports allocated to DS1 or DS3 terminations depends on the particular application. The extreme cases are when all of the ports are allocated for DS3's (248 DS3's) or for DS1's (6944 DS1's).

Generally, a DACS II unit is used for access and cross-connection of DS0 channels. The DACS II unit is software based. The DACS It unit has both main and secondary controllers, centralized and distributed memory, and single-stage, non-blocking timeslot interchange circuitry. Small and large frame complexes and modular equipment design allow the DACS II unit to be economically deployed in both large and small installations.

A DACS II unit accesses DS0 information channels in the digital signals connected to it. This access allows cross-connection of DS0 channels without decoding them to analog and allows channels to be brought outside the DACS II unit for testing. The cross-connect and test-access operations are initiated by commands entered on an administrative link.

A DACS II unit uses a well known process called time slot interchange to electronically cross-connect single DS0 channels or any continuous range of up to 24 DS0 channels within the DACS II cross-connect network. When three bays are equipped to terminate 640 DS1 facilities (original interface bays), the DACS II unit can connect all 15,360 DS0 channels in various cross-connect circuit configurations. If the CEF (capacity expansion frame) is equipped for 2,560 DS1 facilities, the DACS II unit can connect all 61,440 DS0 channels.

A DACS II unit is equipped with a subrate feature, such that it can cross-connect, access for testing, and multiplex subrate (2.4-kb/s, 4.8-kb/s, and 9.6-kb/s) and 56-kb/s digital data channels.

In the present invention, the DACS IV unit 206 exchanges DS3 traffic with a number of sources. For example, the DACS IV unit 206 exchanges up to 27 DS3 circuits with the access module 122. The DACS IV unit 206 also exchanges up to 9, 4, 72, and 136 DS3 circuits with a DACS IV unit 244, a DTMS/FASTAR unit 230, the DACS II unit 208, and a DACS IIIL unit 212, respectively. Note that the number of DS3 circuits that are transferred at any one time over every communication line in the intertoll module 124 are indicated in FIGS. 2A and 2B.

The capacity of the DACS IV unit 206 is equal to 248 DS3 circuits (this capacity figure indicates the maximum number of DS3 circuits that it can process at any one time). In the scenario of FIGS. 2A and 2B the intertoll module 124 has been configured so that the DACS IV unit 206 exchanges with other devices at most 248 DS3 circuits (27+9+4+72+136) at any one time. Thus, the capacity of the DACS IV unit 206 is never exceeded.

The DACS IV unit 206 performs re-packaging and routing functions. Each DS3 circuit contains 28 DS1 (digital signal level one) circuits. The 28 DS1 circuits in a given DS3 circuit may have different end destinations. For example, suppose the general end destination of a DS3 circuit is Washington, DC. Some of the DS1 circuits in this DS3 circuit may have an end destination of a first building in Washington, while other DS1 circuits may have an end destination of a second building in Washington.

The DACS IV unit 206 extracts the DS1 circuits from each DS3 circuit which it receives. Then, the DACS IV unit 206 re-packages the DS1 circuits to create new DS3 circuits wherein the DS1 circuits in any one DS3 circuit have a common end destination. Thus, in the above example, the DACS IV unit 206 puts all of the DS1 circuits going to the first building in Washington into one DS3 circuit, and all of the DS1 circuits going to the second building in Washington into another DS3 circuit. While performing this re-packaging function, the DACS IV unit 206 may also endeavor to place voice traffic, facsimile traffic, digital data traffic, etc., in separate DS3 circuits (for example, all voice traffic DS1 circuits going to a particular location would be placed in one DS3 circuit). The DACS IV unit 206 performs its re-packaging function using well known techniques.

As indicated above, the DACS IV unit 206 also performs a routing function. After re-packaging the DS3 circuits, the DACS IV unit 206 may forward the re-packaged DS3 circuits to the DACS II unit 208 for further processing (described below), or may send the re-packaged DS3 circuits to a DACS IIIL unit 212 for transfer of the re-packaged DS3 circuits over fiber optic cables 136 of the long distance telephone network 108 (also described below). The DACS IV unit 206 may instead send the DS3 circuits (either before or after re-packaging) to the DACS IV unit 244 in trailer 242. Transfer of DS3 circuits between the DACS IV unit 206 and the DACS IV unit 244 may occur, for example, to reduce the processing burden of either the DACS IV unit 206 or the DACS IV unit 244. The DACS IV unit 206 performs its routing function using well known techniques.

The DACS IV unit 206 is controlled by a DTMS/FASTAR (digital test maintenance station/fast automatic restoration) unit 230. FASTAR is described, for example, in U.S. Pat. No. 5,182,744 to Askew et al., which is herein incorporated by reference in its entirety. The DTMS/FASTAR unit 230 is preferably housed in its own trailer. The DTMS/FASTAR unit 230 is essentially a controller which sends packaging and/or routing commands to the DACS IV unit 206 (the transfer of these control signals is not shown in FIGS. 2A and 2B. The DACS IV unit 206 operates pursuant to these commands. The DTMS/FASTAR unit 230 also continuously tests the DACS IV unit 206 to ensure proper operation of the DACS IV unit 206. Such testing is performed by exchanging up to four DS3 circuits with the DACS IV unit 206 (the exchange of test DS3 circuits is indicated in FIGS. 2A and 2B using dashed lines).

The DTMS/FASTAR unit 230 includes a terminal (not shown) to receive commands from an operator. These commands are transferred to the DACS IV unit 206, as discussed above. The DTMS/FASTAR 230 also receives operator commands over a local area network (not shown), and over a satellite link via a satellite antenna 240.

As indicated above, the DACS IV unit 206 may forward the repackaged DS3 circuits to the DACS II unit 208 for further processing. The DACS II unit 208 shall now be described.

The DACS II unit 208 processes individual voice circuits (there are 24 individual voice circuits in each DS1 circuit). The DACS II unit 208 can perform sub-rate functions when processing DS0 level signals. Thus, the DACS II unit 208 operates at the voice circuit level or, equivalently, the DS0 level (digital signal level 0). This is in contrast to the DACS IV unit 206, which operates at the DS1 circuit level.

The DACS IV unit 206 transfers to the DACS II unit 208 any DS3 circuits having voice circuits (that is, DS0 circuits) contained therein that require individual "grooming" or processing. The capacity of the DACS II unit 208 is 72 DS3 circuits. The DACS II unit 208 extracts the DS0 circuits from the DS3 circuits which it receives, and then processes the extracted DS0 circuits which require individual circuit processing. Such individual circuit processing is well known. Once this processing is complete, the DACS II unit 208 re-packages the DS0 circuits into DS3 circuits, and forwards these DS3 circuits back to the DACS IV unit 206. The manner in which the DACS II unit 208 performs the above-described individual voice circuit processing is well known.

Like the DACS IV unit 206, the DACS II unit 208 also receives commands from the DTMS/FASTAR unit 230. The DACS II unit 208 performs individual circuit processing pursuant to these commands.

As discussed above, the DACS IV unit 206 may send the re-packaged DS3 circuits to a DACS IIIL (digital access cross connect system three large) unit 212. The DACS IIIL unit 212 shall now be described.

The DACS IIIL unit 212 is housed in a trailer 210. This trailer 210 also houses a number of light wave systems (LWS). The structure and operation of DACS IIIL units and light wave systems are well known. DACS IIIL units and light wave systems (or equivalent units) are commercially available from a number of manufacturers, such as AT&T Network Systems, 1600 Osgood Street, North Andover, Mass. and Alcatri, P.O. Box 833802, Richardson, Tex. It should be understood, however, that other units can be used in place of the DACS IIIL units and the light wave systems, as long as these other units perform essentially the same functions of the DACS IIIL units and the light wave systems, as described below.

The DACS IIIL unit 212 receives DS3 circuits from a number of sources, such as the DACS IV unit 206 and the access module 122. The capacity of the DACS IIIL unit 212 is 1920 DS3 circuits. The DACS IIIL unit 212 routes the outgoing DS3 circuits (that is, DS3 circuits which are to be transferred over the long distance telephone network 108) which it receives to various light wave systems (LWS) 214, 216, 218, 222, 224, 226, 228 (note that light wave systems 214, 216, 218 are in trailer 210 and light wave systems 222, 224, 226, 228 are in trailer 220, although other configurations could be used). The DACS IIIL unit 212 preferably sends at most 720 DS3 circuits to the light wave systems 214, 216, 218, and at most 720 DS3 circuits to the light wave systems 222, 224, 226, 228 (this is indicated in FIGS. 2A and 2B.

The DACS IIIL unit 212 performs its switching function in a well known manner according to destination. Thus, the DACS IIIL unit 212 is a switch which makes switching decisions based on destination.

The DACS IIIL unit 212 operates by extracting destination information from every DS3 circuit which it receives. It then forwards the DS3 circuits to components of the intertoll module 124 which service those destinations. For example, suppose the DACS IIIL unit 212 receives a DS3 circuit whose destination is Richmond, Va. Also suppose that fiber optic cable 136Q in the long distance telephone network 108 carries traffic to Richmond. In this scenario, the DACS IIIL unit 212 routes the DS3 circuit to the light wave system 228 in trailer 220, since this light wave system 228 is connected to the fiber optic cable 136Q that carries traffic to Richmond.

The DACS IIIL unit 212 is controlled by the DTMS/FASTAR unit 230. The DTMS/FASTAR unit 230 sends routing information and commands to the DACS IIIL unit 212 (the transfer of these control signals is not shown in FIGS. 2A and 2B). The DACS IIIL unit 212 operates pursuant to these commands. The DTMS/FASTAR unit 230 also continuously tests the DACS IIIL unit 212 to ensure proper operation of the DACS IIIL unit 212. Such testing is performed by exchanging up to 24 DS3 circuits with the DACS IIIL unit 212 (the exchange of test DS3 circuits is indicated in FIGS. 2A and 2B using dashed lines).

The structure and operation of the DACS IIIL unit 212 are well known. Thus, further details pertaining to the DACS IIIL unit 212 will be apparent to persons skilled in the relevant art.

As discussed above, the DACS IIIL unit 212 receives DS3 traffic from and sends DS3 traffic to light wave systems (LWS) 214, 216, 218, 222, 224, 226, 228. These light wave systems 214, 216, 218, 222, 224, 226, 228 shall now be discussed.

Consider light wave system 218, which is preferably a 1×7 1550 light wave system (1550 indicates that this light wave system operates with a 1550 nano second lightwave length). Light wave system 218 includes one protection line and seven in-service lines. The protection line represents a standby line that is used in the event of a failure of one of the in-service lines. Each of these eight lines (and the circuitry within the light wave system 218 associated with these eight lines) can process up to 36 DS3 circuits. Thus, the maximum capacity of the light wave system 218 (assuming use of all eight lines) is 288 DS3 circuits.

The eight lines of the light wave system 218 are connected to fiber optic cable 136R in the long distance telephone network 108 (note that fiber optic cable 136R, as the case with all of the fiber optic cables 136 shown in FIGS. 2A and 2B may represent one or more fiber optic cables). The light wave system 218 operates to route the outgoing DS3 circuits which it receives to the eight lines. This routing is done according to destination. The light wave system 218 performs this routing function using well known techniques.

Then, for each of the eight lines of the light wave system 218, the light wave system 218 modules a light beam according to the DS3 traffic which has been routed to that line and then transmits that modulated light beam on the fiber optic cable 136R. The light wave system 218 performs this modulation function using well known techniques.

All of the light wave systems shown in FIGS. 2A and 2B are substantially the same (structurally and operationally) as the light wave system 218 just described. However, the light wave systems differ in terms of destination and capacity. Specifically, the light wave systems shown in FIGS. 2A and 2B are all connected to different fiber optic cables 136. Thus, they exchange telecommunications traffic with different destinations.

Also, the light wave systems differ in terms of capacity. As discussed above, light wave system 218 is preferably a 1×7 1550 light wave system and, thus, has a capacity of 288 DS3 circuits. Some of the other light wave systems shown in FIGS. 2A and 2B may also be 1×7 1550 light wave systems. However, other light wave systems shown in FIGS. 2A and 2B may be 1×7 1310, 1×3 1310, 1×5 1310, or other light wave systems. These light wave systems differ in capacity, as will be appreciated by persons skilled in the relevant art. Otherwise, they are essentially the same. The structure and operation of the light wave systems identified and/or discussed above are well known. They are commercially available from a number of manufacturers, as discussed above.

The description of the first primary communication path in the intertoll module 124 is now complete. The second and third primary paths are similar to the first primary communication path. They differ in their connectivity to fiber optic cables 136A–136T of the long distance telephone network 108.

Specifically, the second primary path includes trailers 242, 248, and 258. Trailer 242 is essentially the same as trailer 204 of the first primary path. Also, trailers 248 and 258 are essentially the same as trailers 210 and 220 of the first primary path.

The third primary path includes trailers 272, 280, 282, 288, and 296. Trailer 272 is essentially the same as trailer 204 of the first primary path. The combination of trailers 280, 282, 288, and 296 is essentially the same as the combination of trailers 210 and 220 of the first primary path.

The intertoll module 124 also includes a second DTMS/FASTAR unit 268 (preferably in its own trailer) which is similar to the other DTMS/FASTAR unit 230. The second DTMS/FASTAR unit 268 essentially controls the components of the third primary communication path. Like the DTMS/FASTAR unit 230, the second DTMS/FASTAR unit 268 can receive operator commands via satellite using a satellite antenna 270.

The intertoll module 124 also includes a DACS IV unit 266 (preferably in its own trailer). Note that this DACS IV unit 266 is not associated with a DACS II unit. Thus, DS3 circuits which do not have any DS1 circuits needing individual circuit processing are routed to this DACS IV unit 266.

The intertoll module 124 also includes a radio terminal 297 (preferably in its own trailer). Traffic which is to be transmitted by radio is transferred to this unit 297.

Note that the three primary communication paths contained in the intertoll module 124 are interconnected by communication lines that run between the trailers. These communication lines are in addition to those that connect the trailers contained in each of the three primary paths. According to the present invention, the trailers (and the components contained in the trailers) are interconnected in such a manner as to duplicate the functionality of the central office 106 that has been rendered inoperable. Since the intertoll module 124 duplicates the functionality of the inoperable central office 106, the intertoll module 124 can be used to replace the inoperable central office 106, thereby restoring long distance communication service to users affected by the inoperable central office 106.

Accordingly, the connectivity shown in FIGS. 2A and 2B is implementation dependent. The connectivity of the intertoll module 124 will no doubt vary from one central office to another. Connecting the components of the intertoll module 124 so as to duplicate the functionality of an inoperable central office will be apparent to persons skilled in the relevant art.

III. Off-Site Component

As discussed above, the off-site component 126 emulates major switching functions of the inoperable central office 106. The off-site component 126 is too large to practically transport. Thus, the off-site component 126 is permanently maintained at a strategically located site (preferably Illinois). Illinois is strategically located because it is generally centrally located in North America. The off-site component 126 is described in greater detail in this section.

The off-site component 126 represents a communication switch that is used to restore long distance service following a disaster at a central office. Accordingly, the off-site component 126 is also called a restoration switch.

The restoration switch 126 performs the functions of a 4 ESS (type four electronic switching system) communication switch. In fact, the restoration switch 126 is preferably implemented using a 4 ESS communication switch. The restoration switch 126 replaces the 4 ESS communication switch which is contained in the inoperable central office 106.

4 ESS communication switches are well known, and are commercially available from a number of manufacturers, such as AT&T Network Systems, 1600 Osgood Street, North Andover, Mass. However, it should be understood that the restoration switch 126 could be alternatively implemented using other types of communication switches.

Referring to FIG. 1, once the telephone disaster recovery unit 103 has been integrated into the telephone system (described below), the restoration switch receives traffic from the intertoll module 124 over the long distance telephone network 108. The restoration switch 126 then routes the traffic through the long distance telephone network 108 to the appropriate end destinations. Also, the restoration switch 126 receives traffic intended for the DC LEC office 104, and routes this traffic through the long distance telephone network 108 to the intertoll module 124.

As discussed above, the off-site component 126 is permanently connected to all of the central offices 106, 110, 114 of the long distance carrier via the long distance telephone network 108 (see communication media 132, 134 and 138, for example, in FIG. 1). However, a permanent connection between the restoration switch 126 and the on-site module 120 does not exist. Thus, after the on-site module 120 is transported to the site of the inoperable central office 106, a communication link through the long distance telephone network 108 is established to link the on-site component 120 (specifically, the intertoll module 124) with the restoration switch 126. This communication link is established using spare communication media, such as fiber optic cables 136 having capacity that is not being used. Recall that these fiber optic cables 136 are the same as those connected to the light wave systems (such as light wave system 214) of the intertoll module 124 (FIGS. 2A and 2B).

IV. Restoration Methodology

Figure 3A:
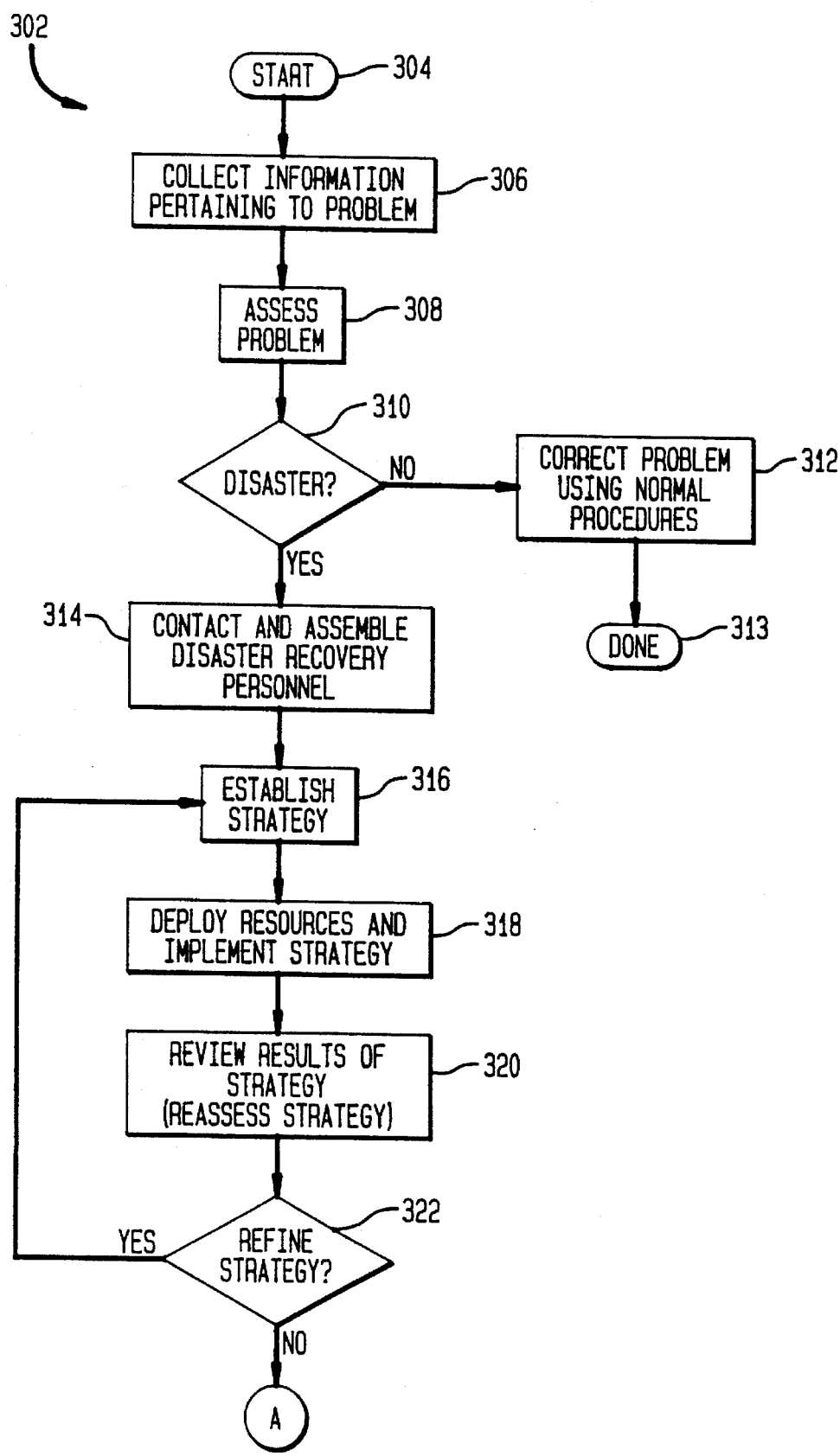
FIGS. 3A, 3B, 4A, and 4B illustrate flowcharts depicting a long distance telephone restoration procedure according to the present invention.

The manner in which long distance telephone service is restored after a central office 106 is rendered inoperable shall now be described in detail with reference to a restoration flowchart 302 shown in FIGS. 3A and 3B. The flowcharts presented and discussed herein are of sufficient detail to enable a person skilled in the relevant art to practice the invention. The steps of flowchart 302 are performed for each disaster (or, more generally, for each problem with a central office). Flowchart 302 begins with step 304, where control immediately passes to step 306.

In step 306, a network operations control center (NOCC), which is responsible for controlling and maintaining the long distance telephone network 108, collects information pertaining to a potential problem with a central office (actually, the NOCC collects information pertaining to all problems with the long distance telephone network 108, but for purposes of the present invention only that information pertaining to potential problems with central offices are considered). This information may be sent to the NOCC from central offices, frown an operational support system (comprising computers which monitor the network 108), from maintenance personnel, etc. The NOCC transfers this information to a disaster recovery management team (DRMT).

In step 308, the DRMT analyzes the information provided by the NOCC to determine whether a problem exists with a central office. If it is determined that a problem exists, then the DRMT assesses the magnitude and severity of the problem. The DRMT essentially classifies a problem as either an emergency or a disaster. An emergency represents a failure of an isolated number of one or more components in the central office. Generally, an emergency can be alleviated in 48 hours or less. A disaster represents a system wide failure of components in the central office. A disaster cannot be alleviated in less than 48 hours and, in fact, it may take much longer (many months) to permanently repair a central office that has been rendered inoperable by a disaster.

As indicated by step 310, if in step 308 the DRMT determines that the problem represents an emergency, then step 312 is performed. In step 312, the DRMT deploys the resources necessary to correct the problem using conventional procedures. For example, in step 312, the DRMT may deploy a maintenance team to repair the central office. While the central office is being repaired, long distance service to the affected LEC office may be fully or partially down. However, since repairs will take a minimum amount of time, any such down time is deemed to be acceptable. Flowchart 302 is complete after processing step 312, as indicated by step 313.

If, in step 308, the DRMT determines that the problem represents a disaster, then the series of steps beginning with step 314 are performed. These steps involve integrating the telephone disaster recovery unit 103 into the telephone system 102 in order to replaced the inoperable central office 106.

Specifically, in step 314 the DRMT contacts and assembles the disaster recovery team. This is a pre-existing group of individuals whose responsibilities include responding to disaster-level failures of the long distance telephone network 108. Thus, in step 314, the DRMT contacts these personnel to inform them that a disaster-level failure of the network 108 exists, and that their services will soon be needed.

In step 316, the DRMT establishes a strategy for responding to the disaster. This step 316 involves a second assessment of the problem to determine the amount of resources that will be required to correct the problem. For example, during step 316, the DRMT determines how much equipment (that is, how many trailers) must be sent to the disaster site (the site where the inoperable central office 106 is located). As discussed above, the intertoll module 124 includes a plurality of trailers, many more than those shown in FIGS. 2A and 2B. During step 316, the DRMT determines how many of these trailers of the intertoll module 124 must be sent to the disaster site in order to duplicate the functionality of the inoperable central office 106. Also during step 316, the DRMT identifies the personnel who will be required to address and alleviate the disaster, and assigns responsibilities to each of these personnel.

In step 318, the DRMT deploys the resources that were identified in step 316, and implements the strategy that was determined in step 316. Specifically, the trailers comprising the on-site component 120 are transported by whatever means necessary (truck, rail, plane, ship, etc.) to the disaster site. The on-site component 120 is connected to the LEC office 104. Then, the on-site component 120 is connected to the long distance telephone network 108 using spare communication media 136 (such that the on-site component 120 is effectively connected to the off-site component 126). The on-site component 120 and the off-site component 126 are then brought on-line to replace the inoperable central office 106, such that long distance telephone service is restored to the affected LEC office 104. Step 318 is described further below.

In step 320, after the telephone disaster recovery unit 103 has been integrated into the telephone system 102 to replace the inoperable central office 106 (step 318) and has been brought on line, the DRMT reviews the results of the strategy determined in step 316. Essentially, the DRMT determines whether long distance service has been satisfactorily restored to the affected LEC office 104 (and the users connected to the affected LEC office 104). If long distance telephone service has not been satisfactorily restored, then control returns to step 316 to refine the strategy (as indicated by step 322). Such refinement may include sending additional trailers to the disaster site, or a different mapping of the inoperable central office 106 (a different mapping will change the inter-connectivity of the elements in the intertoll module 124).

Figure 3B:
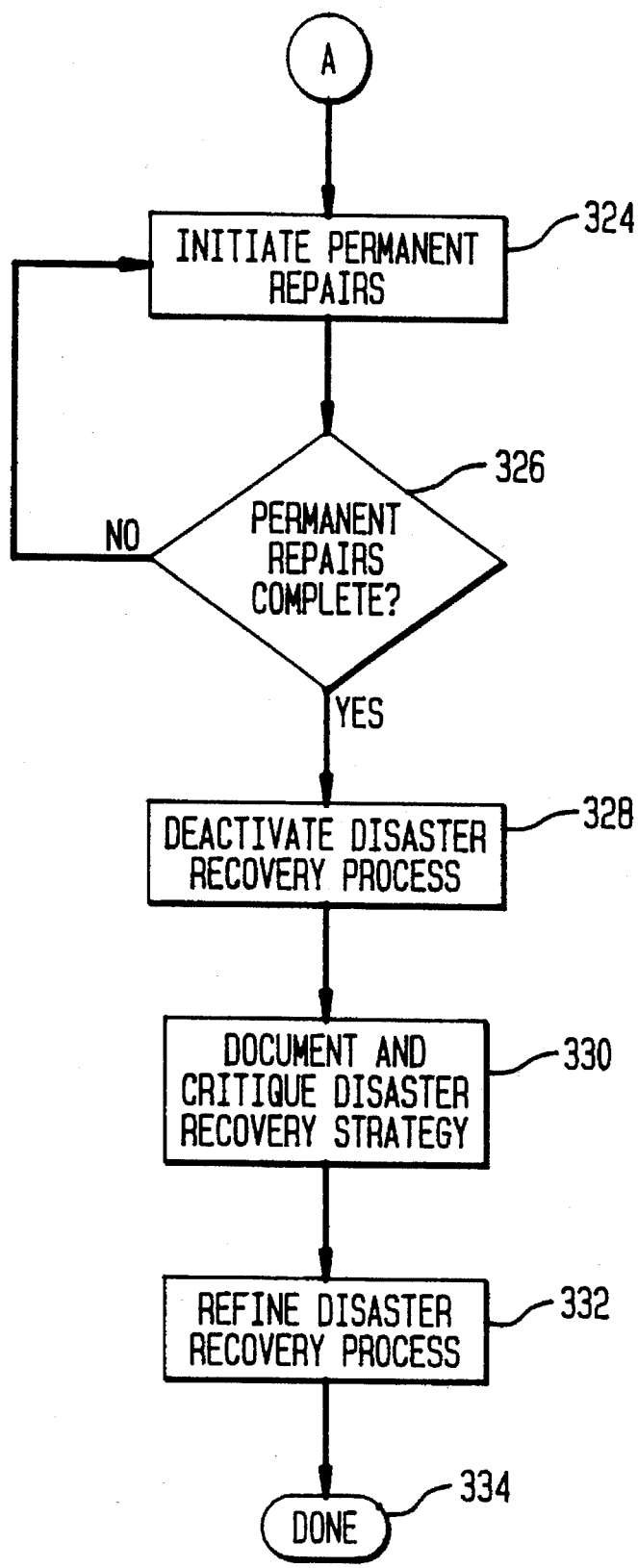

If long distance telephone service has been satisfactorily restored, then step 324 is performed (FIG. 3B). In step 324, the DRMT initiates permanent repairs to the inoperable central office 106. Such repairs may take months. However, while the central office 106 is being repaired, long distance telephone service is provided to the LEC office 104 (and the users connected to the LEC office 104) via the telephone disaster recovery unit 103 of the present invention. Thus, these users need not utilize other long distance carriers to satisfy their long distance telephone needs. Accordingly, the original long distance carrier (that is, the carrier who owns the inoperable central office 106) does not lose customers.

As indicated by step 326, step 328 is performed after permanent repairs to the central office 106 are complete. In step 328, the DRMT deactivates the disaster recovery process. Specifically, the DRMT removes the telephone disaster recovery unit 103 from the telephone system 102 (i.e., the on-site module 103 is disconnected from the telephone system 102 and returned to its storage location), and the fully repaired central office 106 is brought on-line.

In step 330, the DRMT documents the disaster recovery strategy that was determined and refined in step 316. The DRMT also critiques this disaster recovery strategy to determine its flaws and good points.

In step 332, the DRMT refines the disaster recovery process in accordance with the critique of step 330 so that future disasters will be handled in an even more efficient and expedient manner. Flowchart 302 is complete after processing step 332, as indicated by step 334.

Figure 4A:
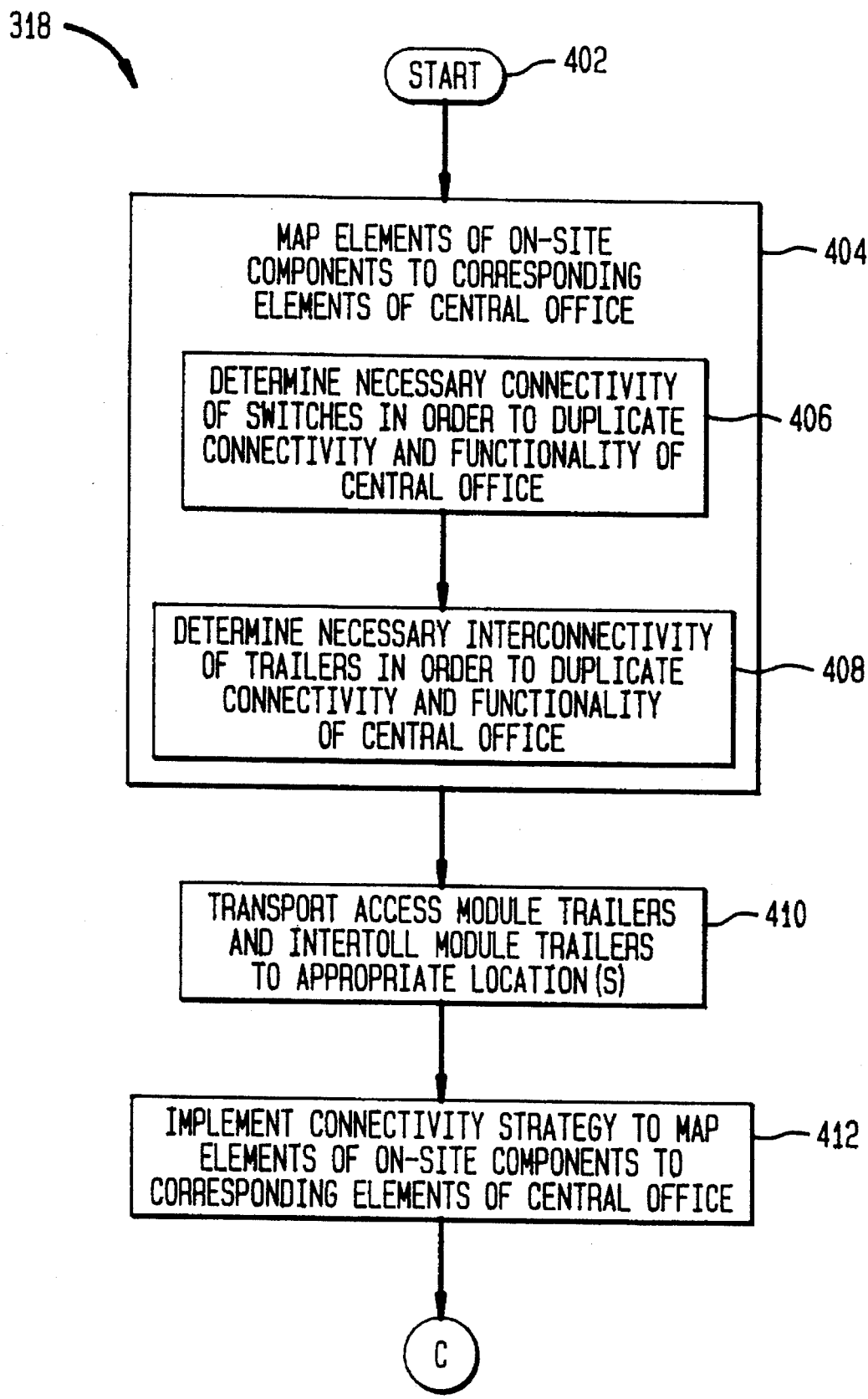
Figure 4B:
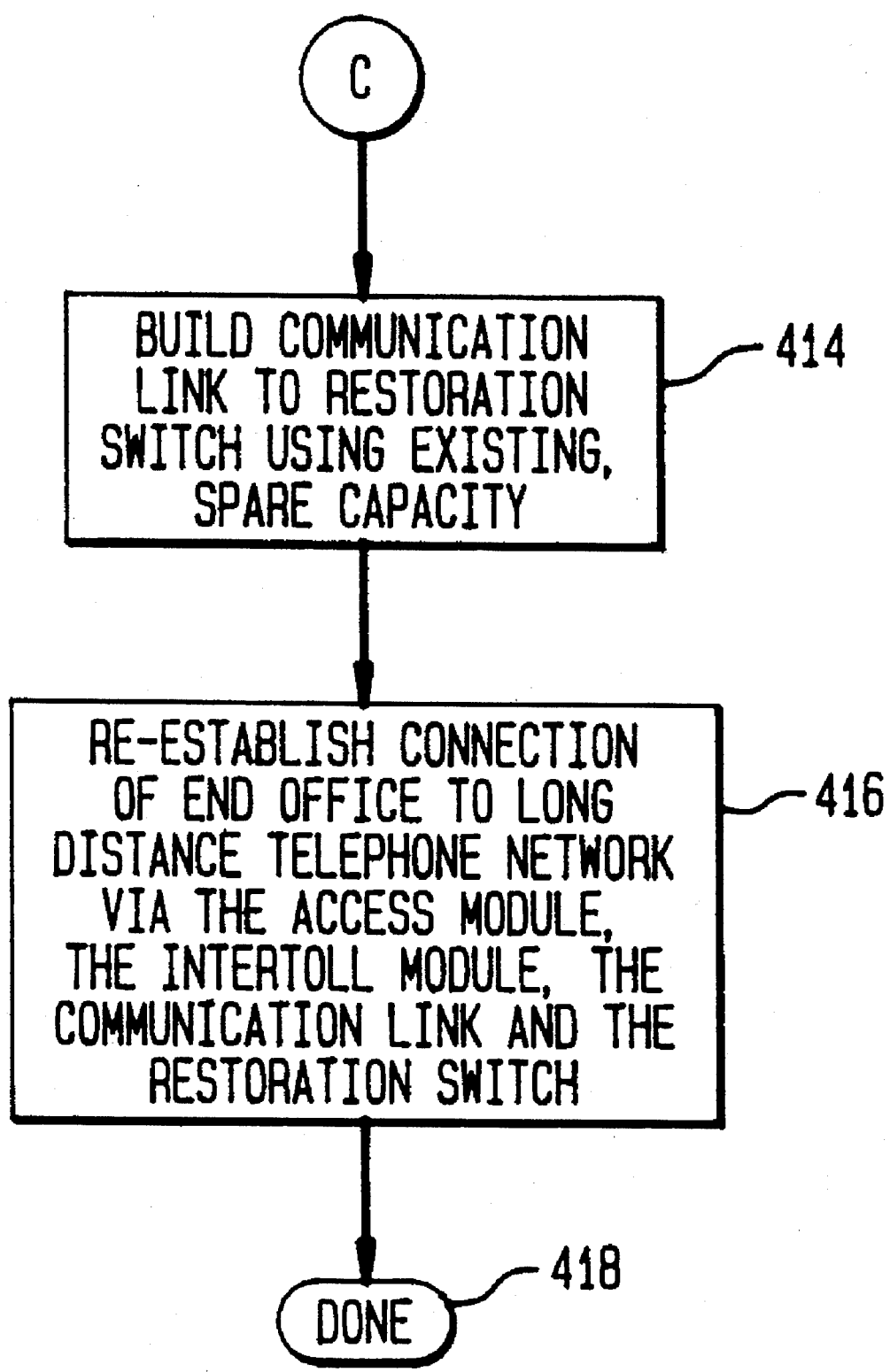

As discussed above, the DRMT in step 318 deploys the resources that were identified in step 316, and implements the strategy that was determined in step 316. Step 318 shall now be described in greater detail with reference to FIGS. 4A and 4B. It should be noted that the ordering of steps in FIGS. 4A and 4B are provided for example purposes only. The steps in FIGS. 4A and 4B can be ordered differently (for example, steps 406 and 408 can be performed after step 410). Implementation of step 318 begins with step 402 in FIG. 4A, where control passes immediately to step 404.

In step 404, the DRMT maps the elements of the on-site component 120 to the elements of the inoperable central office 106. Such mapping is necessary to properly configure and interconnect the elements of the on-site component 120 to duplicate the functionality of the inoperable central office 106. For example, the interconnectivity of elements in the on-site component 120 (and particularly the intertoll module 124) of FIG. 2 corresponds to the interconnectivity that exists in the particular inoperable LEC office 106. The three primary paths (discussed above) in the intertoll module 124 corresponds to three such paths in the inoperable LEC office 106. Thus, the on-site component 120 duplicates the functionality of this particular LEC office 106, and can be used to replace the LEC office 106 in the telephone system 102.

Step 404 includes steps 406 and 408. Steps 406 and 408 are performed by a computer and associated computer software. In step 406, the DRMT determines the necessary configuration and connectivity of the switches of the on-site component 120 (such as the DACS IV units 206, 244, 266, 274, the DACS II units 208, 246, 276, and the DACS IIIL units 212, 250, 280) to duplicate the functionality of corresponding components in the inoperable central office 106. For the most part, step 404 involves determining internal settings of such switches, and also involves determining interconnecting between elements within trailers, such as between the DACS IV unit 206 and the DACS II unit 208 within trailer 204.

In step 408, the DRMT determines the necessary interconnectivity of the trailers (such as the interconnectivity between trailers 204 and 210) to duplicate the functionality of corresponding components in the inoperable central office 106.

In step 410, the trailer(s) of access module 122 and the trailers of the intertoll module 124 are transported to the appropriate location(s). Specifically, the trailer(s) of the access module 122 are transported to the disaster site where the inoperable central office 106 is located. The trailers of the intertoll module 124 are transported to a location that is proximate to the disaster site fit may even be the disaster site); this location is one that would facilitate connection of the intertoll module 124 to the long distance telephone network 108.

Other resources are also deployed during step 410, such as members of the disaster recovery team.

In step 412, the connectivity and configuration strategy determined in steps 406 and 408 are implemented (by disaster recovery personnel who were deployed in step 410) to map the elements of the on-site component 120 to the elements of the inoperable central office 106. Upon the completion of step 412, the on-site component 120 has been configured and interconnected such that it duplicates the functionality of the inoperable central office 106.

In step 414 (FIG. 4B), members of the disaster recovery team (deployed in step 410) build a communication link between the on-site component 120 (and particularly the intertoll module 124) and the restoration switch 126 (more generally, members of the disaster recovery team build a communication link between the on-site component 120 and the long distance telephone network 108). This communication link is built using spare communication media 136 (such as spare fiber optic cables) of the long distance telephone network 108 (by "spare", it is meant that this communication media 136 has excess telecommunications capacity that is not being used).

Also during step 414, the access module 122 is connected to the LEC office 104 that is connected to the inoperable central office 106 (alternatively, this can be done during step 412). Thus, upon the completion of step 414, the on-site module 120 has been inserted into the telephone system 102, replacing the inoperable central office 106.

In step 416, the on-site component 120 and the off-site component 126 are brought on-line to replace the inoperable central office 106, such that long distance telephone service is restored to the affected LEC office 104 via the access module 122, the intertoll module 124, and the restoration switch 126.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A telephone disaster recovery unit for quickly re-establishing long distance telephone service to a telephone LEC office after a telephone central office connected to the LEC office has been rendered inoperable by a disaster, the central office located at a disaster site, the telephone disaster recovery unit comprising:

a mobile, on-site component configured to emulate access and intertoll functions of the inoperable central office, said on-site component transported to the disaster site and connected to the LEC office;

an off-site component to emulate switching functions of the inoperable central office, said off-site component permanently positioned in a predetermined location;

first communication media in a long distance telephone network to connect said off-site component to other telephone central offices; and second communication media in said long distance telephone network to connect said on-site component to said off-site component.

2. The telephone disaster recovery unit of claim 1, wherein said on-site component comprises:

an access module to emulate access functions of the inoperable central office; and an intertoll module to emulate intertoll functions of the inoperable central office.

3. The telephone disaster recovery unit of claim 2, wherein said access module comprises means for interfacing the LEC office to said intertoll module.

4. The telephone disaster recovery unit of claim 2, wherein said intertoll module comprises a plurality of primary communication paths to transfer traffic between the LEC office and said second communication media, each of said primary communication paths comprising:

packaging and routing means for packaging traffic received from the LEC office according to destination and traffic type, and for routing said packaged traffic to other elements of said intertoll module according to destinations of said packaged traffic; and a plurality of light wave systems, coupled to said packaging and routing means, for modulating light beams according to packaged traffic received from said packaging and routing means, and for transmitting said modulated light beams over said second communication media.

5. The telephone disaster recovery unit of claim, 4, wherein said packaging and routing means is a digital access cross connect system type four (DACS IV) unit.

6. The telephone disaster recovery unit of claim 4, wherein each of said primary communication paths also comprises individual circuit processing means, coupled to said packaging and routing means, for processing individual circuits contained in packaged traffic received from said packaging and routing means.

7. The telephone disaster recovery unit of claim 6, wherein said individual circuit processing means is a digital access cross connect system type two (DACS II) unit.

8. The telephone disaster recovery unit of claim 1, wherein said off-site component is a 4ESS (type four electronic switching system) communication switch.

9. A telephone disaster recovery process for quickly re-establishing long distance telephone service to a telephone LEC office after a telephone central office connected to the LEC office has been rendered inoperable by a disaster, the central office located at a disaster site, the telephone disaster recovery process comprising the steps of:

(1) assessing the disaster and identifying elements of an on-site component needed to address the disaster:

(2) transporting said elements of said on-site component to the disaster site;

(3) mapping said elements of said on-site component to corresponding elements of the inoperable central office;

(4) configuring and interconnecting said elements of said on-site component according to said mapping to enable said on-site component to functionally emulate the inoperable central office;

(5) connecting said on-site component to the LEC office;

(6) connecting said on-site component to an off-site component using communication media in a long distance telephone network, said off-site component emulating switching functions of the inoperable central office, said off-site component permanently positioned in a predetermined location, said off-site component previously connected to other telephone central offices via other communication media in the long distance telephone network; and (7) bringing the on-site component and the off-site component on line to thereby re-establish long distance telephone service to the LEC office.

* * * * *